Jan. 2, 1940.                R. E. YOUNG                 2,185,759
            CIRCUIT CONTROL FOR HEATING SYSTEMS AND THE LIKE
                        Filed June 19, 1937
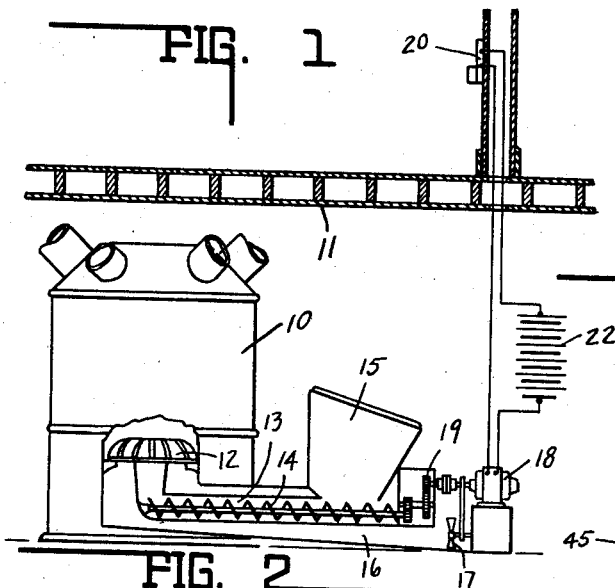
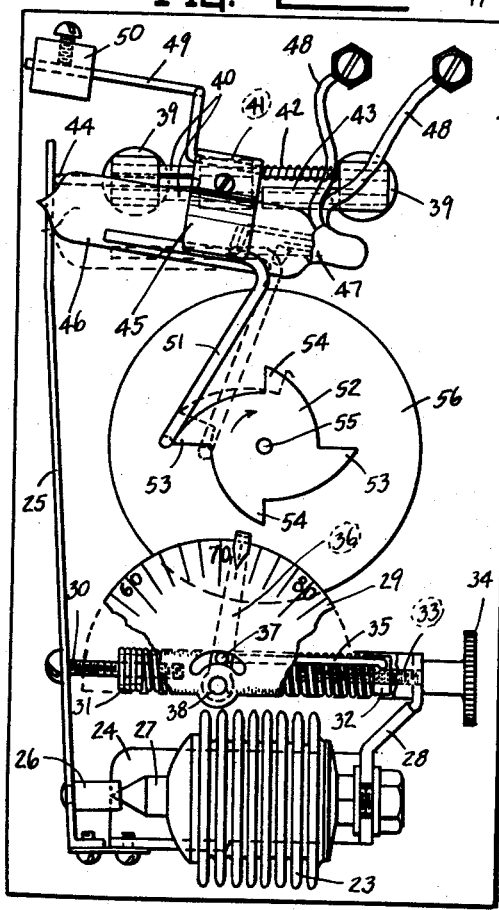
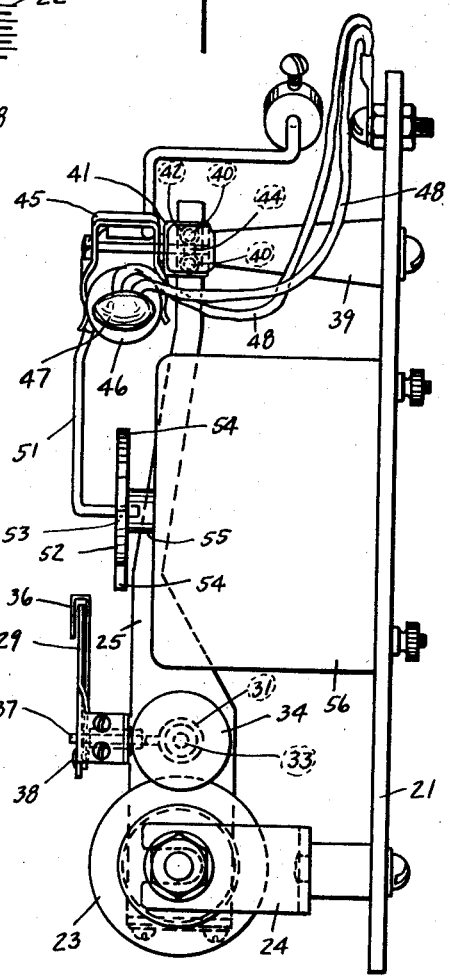
INVENTOR.
RAYMOND E. YOUNG.
BY
ATTORNEYS.

Patented Jan. 2, 1940

2,185,759

UNITED STATES PATENT OFFICE 2,185,759

CIRCUIT CONTROL FOR HEATING SYSTEMS AND THE LIKE

Raymond E. Young, Harvey, Ill., assignor to Whiting Corporation, Harvey, Ill., a corporation of Illinois Application June 19, 1937, Serial No. 149,126

5 Claims. (Cl. 200—139)

This invention relates to an automatic circuit control, particularly adaptable for use in connnection with the fuel feed of a furnace required to deliver heat to a remote compartment, and wherein intermittent stoking is required.

In furnaces operated by stokers, it is necessary to maintain a pilot fire or hot coals even though no heat is required. To this end, it is customary to employ a pilot control which intermittently operates the stoker only sufficient to maintain the fire bed. It is also essential to employ a thermostat for operating the stoker, dependent upon the heat requirements at the remote location of the thermostat. However, by reason of the remote position of the thermostat, there is a lapse of time or lag between the production of heat in the furnace and its delivery at the thermostat location.

It is the object of this invention to provide a single instrument which will not only serve as an intermittent or periodic pilot control and thermostatic control, but also as a "lag" control. The purpose of the lag control is to cause the fuel delivered into the furnace by the stoker to be consumed as rapidly as it is introduced therein, so that it will promptly build up the heat called for by the thermostat, but will not overload the furnace with fuel, resulting in continued heat delivery after the thermostat has reacted, to raise the temperature requirements. This is accomplished by intermittently feeding fuel into the furnace as distinguished from continuously feeding it therein during the entire time that the circuit is closed by the thermostat switch. The intermittent feeding causes an immediate increase in heat produced, but permits complete consumption of the fuel during the intervals between feedings so that the furnace will not be overloaded.

The duration of the feeding and interval between feedings is automatically adjusted and controlled by the temperature requirements through the thermostat. Thus, where the thermostat is set for higher temperature, the duration of feeding will be longer and the interval between feedings shorter, and conversely, wherein a less amount of heat is required, the time of feeding will be automatically shortened and the intervals lengthened.

The full nature of the invention will be understood from the accompanying drawing and the following description and claims.

In the drawing, Fig. 1 is a diagrammatical illustration of the installation and furnace, Fig. 2 is a front elevation of the instrument. Fig. 3 is a side elevation thereof.

In the drawing there is shown a furnace 10 located in a compartment below the floor 11. The furnace is provided with a fuel bed 12 into which a fuel conduit 13 extends through which fuel is fed by a feed screw 14 from a hopper 15. A forced draft conduit 16 leads from a fan 17 into the fuel bed. An electric motor 18 is adapted to drive the fan 17 and the screw 14 through gearing 19.

In the remote compartment above the flooring 11 there is a control instrument having a protective cover 20 and a supporting panel 21. Said instrument is connected in a circuit including a source of current 22 and motor 18.

Mounted on the supporting panel 21 is a thermostatic control of the usual character embodying a collapsible bellows thermostat 23 supported on a bracket 24 to which is yieldingly connected an arm 25, said arm being provided with a projection 26 engaged by a projection 27 on the thermostat. Also secured on the bracket 24 there is an arm 28 upon which is mounted a temperature indicating dial 29. Connected with the arm 25 by a screw 30 there is a spring 31 having a head 32 at the opposite end into which a screw threaded bolt 33 extends having its bearing in the arm 28. A thumb nut 34 is provided for operating the screw bolt to move the head 32 back and forth to vary the tension of the spring 31. Said head 32 carries with it a link 35 pivotally connected to a pointer arm 36 at 37, said pointer arm being pivotally mounted at 38 to the dial.

By means of this structure, which forms no part of the present invention, upon varying the tension of the spring 31 the position of the arm 25 may be varied, the movement of the arm being actuated by the thermostat 23 and the pointer indicating the position of the adjustment in degrees Fahrenheit.

Mounted adjacent the upper end of the arm 25 there is a pair of supporting posts 39 between which the rods 40 extend for slidably supporting a carriage 41. A spring 42 is provided on one of the rods 40 for resisting the right-hand movement of the carriage, and a lock 43 is mounted on the other rod for limiting the right-hand movement thereof. Slidably mounted through the post 39 intermediate said rods there is a plunger 44, the outer end of which is held in engagement with the arm 25 by the spring-pressed carriage 41.

Pivotally mounted upon the carriage 41 there is a clip 45 adapted to clamp a mercury tube switch 46 having a terminal end 47 provided with two terminals connected with the wires 48 leading to the motor 18. Rigidly mounted on the clip 45 there is an arm 49 having an adjustable weight 50 on the outer end thereof.

Extending downwardly from said clip and rigid therewith there is an actuating arm 51 in position to be engaged by a rotating cam 52 provided with a pair of oppositely-disposed projections 53 and a pair of intermediate but oppositely-disposed smaller projections 54. Said cam is mounted on a shaft 55 carried in a casing 56 so as to be rotated through a clock movement—either spring actuated or electrical.

As the cam rotates in the direction indicated by the arrow, the projections engage the lower end of the arm 51 and cause it to swing outwardly, tilting the tube 46 so that the mercury will move toward the contacts. The weight 50 tends to tilt the switch in the opposite direction for normally holding it in such position that the mercury will be out of bridging contact and the arm 51 will be held against the cam. Thus, as the cam projections come into engagement with the arm 51, the mercury tube switch will be tilted toward circuit closing position. By reason of the adjustment and setting of the switch and the radial length of the cams 53, regardless of any action of the thermostat and independently thereof, said cams 53 will cause the switch to be tilted to a position where the contacts will be bridged and the circuit to the motor closed for operating the stoker. But the cams 54 of lesser radial length will not actuate the lever and switch to that extent so that there will be no operation of the stoker during their movement past the arm. In this adjustment, the instrument will function merely as a pilot control to intermittently or periodically actuate the stoker only sufficiently to maintain an ignited fuel bed.

The thermostat, as is well understood, may be adjusted to any desired temperature at its location by operating the thumb screw 34, which adjustment will be indicated as to the temperature desired by the pointer 36, the relations thereof being set by the screw 30. Upon the thermostat being set to a desired temperature, the actual temperature will affect the thermostatic bellows 23 to move the arm 25 in accordance therewith. The movement of the arm 25 will move the carriage 41 through the plunger 44. The position of the carriage will re-position the switch 46 in relation to the cam 52. Thus, there is a change in relative positions between said switch and cam effected by the temperature requirements of the room to be heated. This re-positioning changes the relation of the arm 51 to said cam. Wherein the thermostat adjustment and temperature requirement call for more heat, the switch and arm 51 will be moved to the right or toward the center of the cam so that there will be a greater movement of the arm effected by the cam projections. Thus when it is engaged by the projections 53, it will be moved to a greater extent, resulting in a quicker closing of the circuit for a longer duration. When the shorter cams 54 come into engagement with the arm, the position thereof will be such that they will cause the switch to be tilted sufficiently to close the circuit for a greater or lesser period of time, depending upon the thermostatic action. Thus, instead of two operations of the stoker during a single cycle, there will be four operations when sufficient heat is required.

By reason of the automatic variation in position of the switch and arm 51, dependent upon the heat requirements as called for by the thermostat, not only will the number of actuations of the stoker during a unit of time be automatically varied to meet conditions, but the duration of the operations will be varied.

Thus, when a small amount of heat is required, there will be only a slight movement of the arm 25 insufficient to cause the shorter projections 54 to be effective, in which event the stoker will be operated twice during the cycle. If more heat is called for, the movement of the arm will be greater, which will bring into play a more extensive tilting, whereby the projections 53 will cause the operation of the stoker for a longer duration. When still more heat is required, the further positioning of the arm 25 will so move the arm 51 as to cause the shorter projections 54 to become effective, whereupon there will be a still longer duration of the two periods caused by the projections 53, in addition to which the projections 54 will cause the stoker to be actuated two more times, or four times, during the cycle. If still more heat is required, not only will there be four operations during the cycle, but they will be for a longer duration.

In view of the above, it will be noted that in a single instrument of simple structure there is combined a pilot control, a thermostatic control, and a lag control. The lag control, as before stated, causes operation of the stoker intermittently to permit the fuel to be consumed as it is fed and prevent continuous feeding of fuel to the extent of causing it to be built up, resulting in an accumulation of any unburnt fuel having potential heat resulting in a substantial lag. The lag control, while causing the stoker to function for immediate production of heat upon the call of the thermostat prevents an over production which will be consumed and overheat the compartment after the thermostat has been satisfied.

It will further be noted that in addition to the above, the intermittent stoker action is automatically controlled and varied by the thermostat, both as to the number of operations during a cycle and the duration thereof.

While the above invention has been described in connection with a stoker, it is equally applicable to other uses, and particularly in connection with a source of heat of different fuels and feeding devices.

The invention claimed is:

1. In a device of the class described, the combination of a single cam member mounted for rotation and having two sets of uniformly spaced cam surfaces, one set of said surfaces being located between the other cam surfaces and of greater projection than said other surfaces, a switch member rockingly mounted in proximity to said cam member and having means to open and close an electrical circuit with the rocking movements of said switch member, means to shift the rocking mounting of said switch member with respect to the pivotal mounting of the cam member, temperature controlled means to actuate said shifting means aforesaid, and an element on the rocking mounting for the switch member having means to engage the cam surfaces aforesaid, substantially as described.

2. In a device of the class described, the combination of a cam member having alternate sets of long and short projections, a switch member adjacent to said cam member and having means to open and close a circuit with the tilting movements of the switch member, a rocking mounting for the switch member, means to shift said rocking mounting laterally with respect to the cam member, temperature controlled means to actuate said shifting means, and an element carried by the rocking mounting in position to engage the cam projections, whereby lateral adjustment of the rocking mounting under temperature conditions serves to adjust the contacting of said member with the cam projections, substantially as and for the purpose set forth.

3. In a device of the class described, the combination of a cam member mounted for rotation, and having alternate sets of contacting surfaces, one set being of greater contacting dimension than the other set, a switch member adjacent to the cam member and having means to open and close a circuit with rocking movements of the switch member, a mounting for the switch member having means permitting rocking thereof, said mounting being laterally adjustable, temperature controlled means to adjust the said mounting, and means in connection with the mounting for engagement with the cam surfaces, whereby the duration of engagement of said engaging means with the cam surfaces is determined by the lateral adjustments of the switch mounting under control of the temperature controlled means, substantially as described.

4. In a device of the class described, the combination of a cam member mounted for rotation, and having two sets of cam surfaces, one of greater engaging form than the other, a switch member adjacent to said cam member, a mounting for said switch member permitting rocking movement of the switch member, said mounting being laterally adjustable, temperature controlled means to adjust said mounting, together with means in connection with the switch member engageable with the cam member, whereby the engagements of said means with the cam member are dependent both on the forms of the cam engaging surfaces and also on the lateral adjustments of the mounting aforesaid, substantially as described.

5. In a device of the class described, the combination of a cam member having alternate sets of cam surfaces of alternately greater and lesser engaging form, a pivotal mounting for said cam member, means to rotate the cam member uniformly, a switch member adjacent to the cam member and having means to open and close a circuit with rocking movements of said switch member, a pivotal mounting for the switch member, laterally adjusted supports for the said mounting, temperature controlled means for laterally adjusting said mounting, and means in connection with the switch member engageable with the cam member surfaces, whereby the duration and extent of the engagements of said last named means with the cam member surfaces is dependent on the temperature controlled means and also on the cam surfaces being contacted, substantially as described.

RAYMOND E. YOUNG.